United States Patent [19]

Vannier

[11] Patent Number: 5,487,766
[45] Date of Patent: Jan. 30, 1996

[54] PORTABLE AIR FILTRATION APPARATUS

[76] Inventor: Mervin R. Vannier, 2145 S. 35th St., Omaha, Nebr. 68105

[21] Appl. No.: 248,397

[22] Filed: May 24, 1994

[51] Int. Cl.$^6$ .................................................. B01D 46/02
[52] U.S. Cl. .......................... 55/356; 55/385.1; 55/473; 55/496; 55/DIG. 18; 454/64; 454/65
[58] Field of Search ............... 55/356, DIG. 31, 55/496, 493, 385.1, 385.2, 473, DIG. 18; 454/63, 64, 65, 187, 189, 228

[56] References Cited

U.S. PATENT DOCUMENTS

| | | | |
|---|---|---|---|
| 1,788,171 | 1/1931 | Preble | 55/DIG. 31 |
| 2,175,195 | 10/1939 | Irvine | 55/DIG. 31 |
| 2,703,733 | 3/1955 | Stueven | 55/356 |
| 2,855,837 | 10/1958 | Bakke | 454/63 |
| 3,151,929 | 10/1964 | Potapenko | 422/120 |
| 3,301,167 | 1/1967 | Howard et al. | 454/60 |
| 3,395,972 | 8/1968 | Hardison | 423/210 |
| 3,505,989 | 4/1970 | Truhan | 600/21 |
| 3,511,162 | 5/1970 | Truhan | 454/187 |
| 3,593,503 | 7/1971 | Andrews | 55/496 |
| 3,828,530 | 8/1974 | Peters | 55/DIG. 31 |
| 3,880,061 | 4/1975 | Hensick et al. | 454/66 |
| 3,935,803 | 2/1976 | Bush | 454/189 |
| 3,944,405 | 3/1976 | van Calsteren et al. | 55/338 |
| 4,038,913 | 8/1977 | Earley | 454/64 |
| 4,045,192 | 8/1977 | Eckstein et al. | 55/222 |
| 4,512,245 | 4/1985 | Goldman | 96/142 |
| 4,531,956 | 7/1985 | Howorth | 55/279 |
| 4,667,580 | 5/1987 | Wetzel | 454/187 |
| 4,737,173 | 4/1988 | Kudirka et al. | 96/131 |
| 4,909,815 | 3/1990 | Meyer | 96/131 |

FOREIGN PATENT DOCUMENTS

| | | | |
|---|---|---|---|
| 30845 | 4/1885 | Germany | 454/64 |
| 1530274 | 12/1989 | U.S.S.R. | 454/64 |

Primary Examiner—Jay H. Woo
Assistant Examiner—Duane S. Smith
Attorney, Agent, or Firm—Zarley, McKee, Thomte Voorhees & Sease; Mark D. Frederiksen

[57] ABSTRACT

An air filtration apparatus includes a lower intake duct and an upper exhaust duct interconnected by a telescoping vertical pipe section permitting vertical length adjustability of the exhaust duct relative to the intake duct. A blower is mounted in the vertical pipe section to draw air through an intake opening in the forward end of the intake duct, through the vertical pipe section and outwardly through an exhaust opening in the bottom surface of a forward end of the exhaust duct. Particulate filters are mounted in the intake and exhaust openings. A length adjustable upright extending between the intake duct and exhaust duct permits selective adjustment of the height of the exhaust duct over the intake duct. A filter rack on the forward end of the intake duct includes a clamping apparatus which permits various sizes of filters to be inserted in the filter rack.

9 Claims, 4 Drawing Sheets

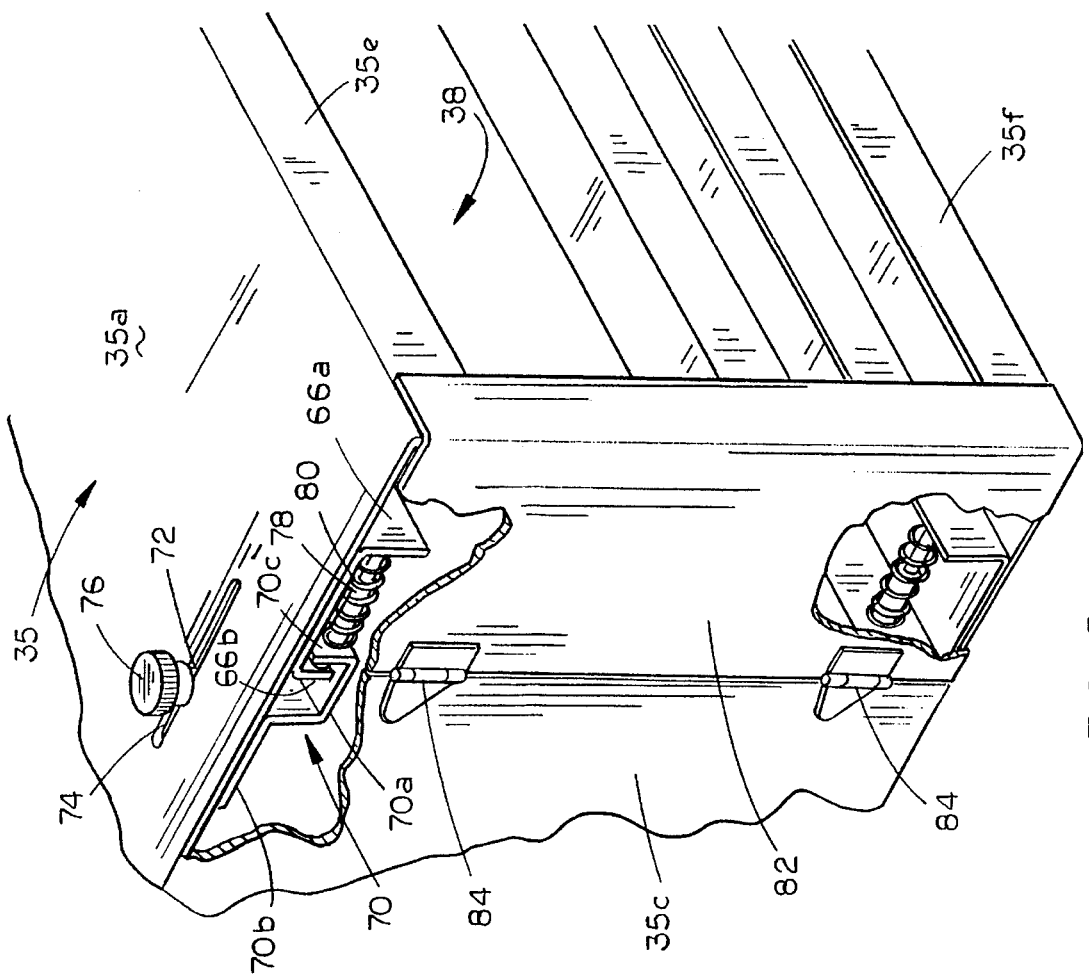
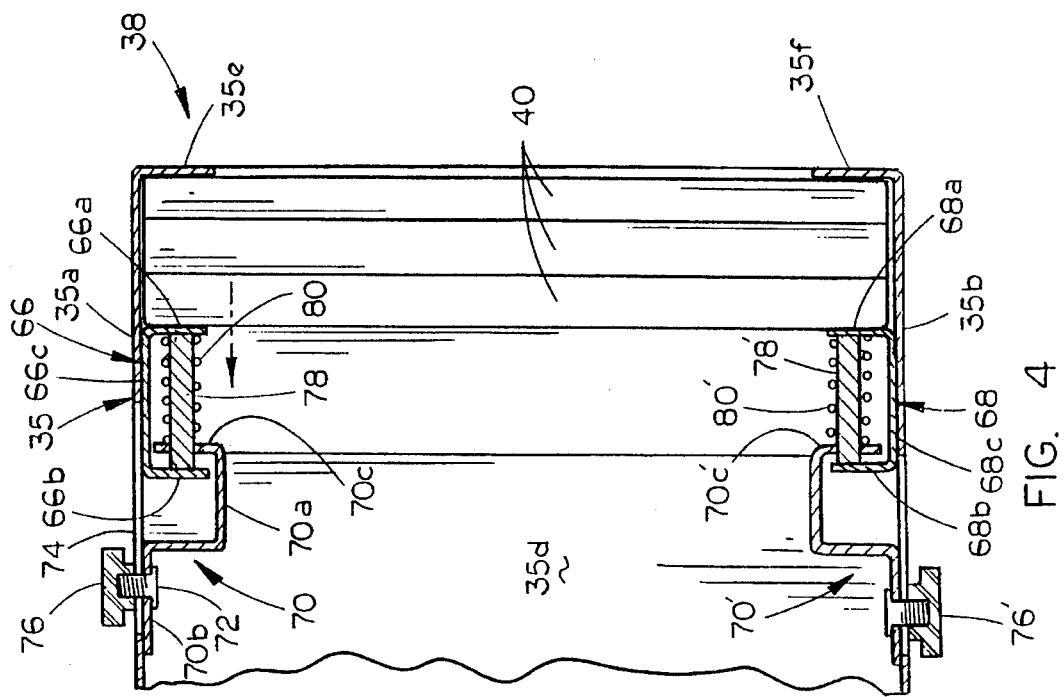

PORTABLE AIR FILTRATION APPARATUS

TECHNICAL FIELD

The present invention relates generally to air filtration apparatus for removing particulate from the air of a work area, and more particularly to an improved portable air filtration apparatus with vertical adjustability.

BACKGROUND OF THE INVENTION

Various systems have been utilized for handling and treating an air stream containing particulates from spray paint or the like. For example, U.S. Pat. No. 3,395,972 describes a system for cleaning the air of dust and noxious fumes in a spray paint booth. The Hardison apparatus is quite large, and stationary, making it difficult to utilize in many spray painting situations.

A mobile air cleaning apparatus is disclosed in U.S. Pat. No. 4,909,815 which provides a base with an intake vent in the upper surface, and an exhaust vent positioned over the base, such that a vehicle being painted may be positioned between the base and overhanging exhaust vent. However, that apparatus is limited to use of vehicles of a predetermined size, or other objects to be painted which may be positioned over the top of the base.

SUMMARY OF THE INVENTION

It is therefore a general object of the present invention to provide an improved portable air filtration apparatus.

A further object is to provide a portable air filtration apparatus with a vertically adjustable exhaust vent.

Still another object is to provide a portable air filtration apparatus with interchangeable filters.

These and other objects will be apparent to those skilled in the art.

The air filtration apparatus of the present invention includes a lower intake duct and an upper exhaust duct interconnected by a telescoping vertical pipe section permitting vertical length adjustability of the exhaust duct relative to the intake duct. A blower is mounted in the vertical pipe section to draw air through an intake opening in the forward end of the intake duct, through the vertical pipe section and outwardly through an exhaust opening in the bottom surface of a forward end of the exhaust duct. Particulate filters are mounted in the intake and exhaust openings. A length adjustable upright extending between the intake duct and exhaust duct permits selective adjustment of the height of the exhaust duct over the intake duct. A filter rack on the forward end of the intake duct includes a clamping apparatus which permits various sizes of filters to be inserted in the filter rack.

BRIEF DESCRIPTION OF THE DRAWINGS

FIG. 4 is a sectional view taken at lines 4—4 in FIG. 2; and

FIG. 5 is an enlarged perspective view of one end of the intake filter rack.

DESCRIPTION OF THE PREFERRED EMBODIMENT

Figure 1:
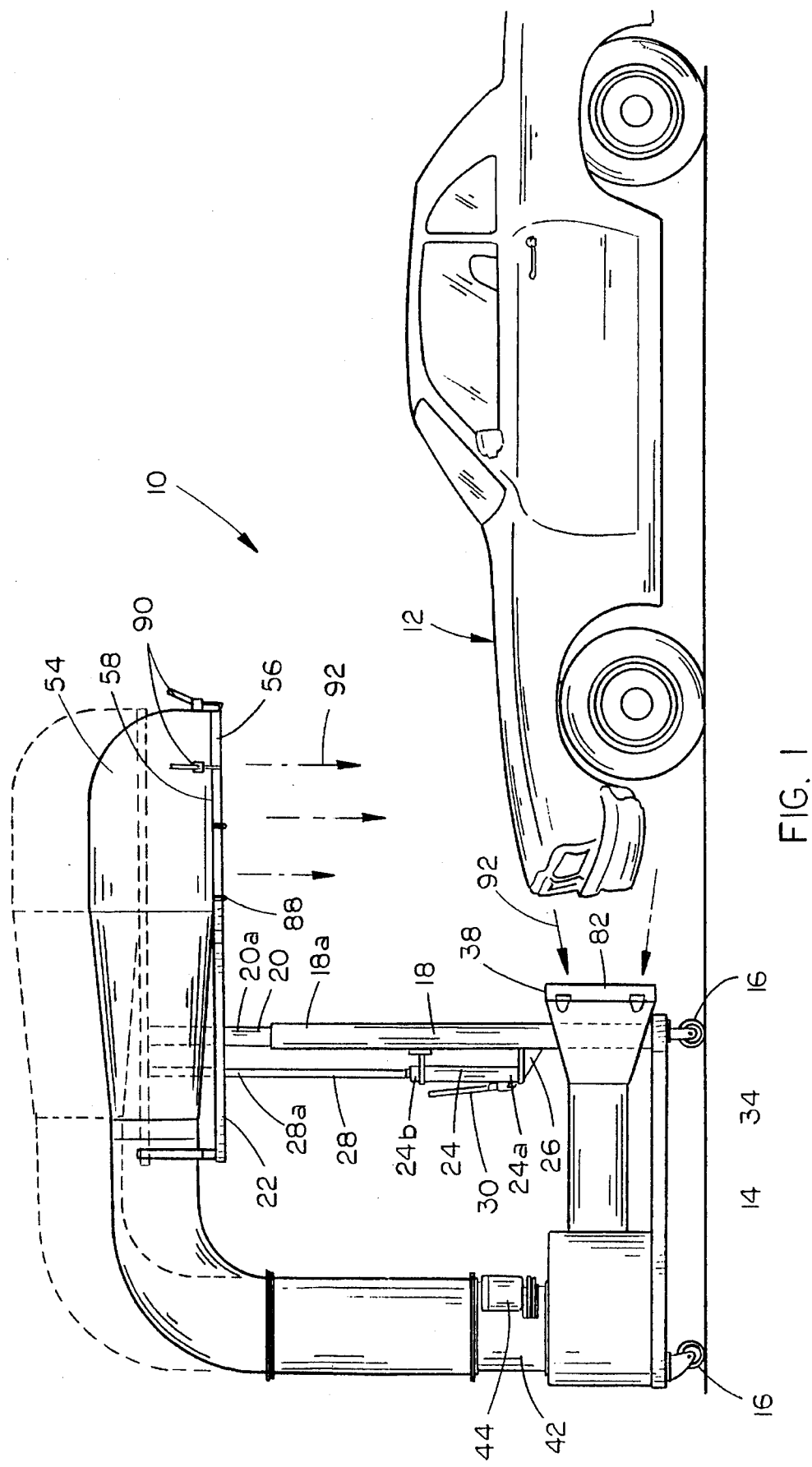
FIG. 1 is a side elevational view of the invention with the front portion of a vehicle located in a position for painting.

Referring now to the drawings, in which similar or corresponding parts are identified with the same reference numeral, and more particularly to FIG. 1, the portable air filtration apparatus of the present invention is designated generally at 10 and is shown located adjacent the forward end of a vehicle 12.

Figure 2:
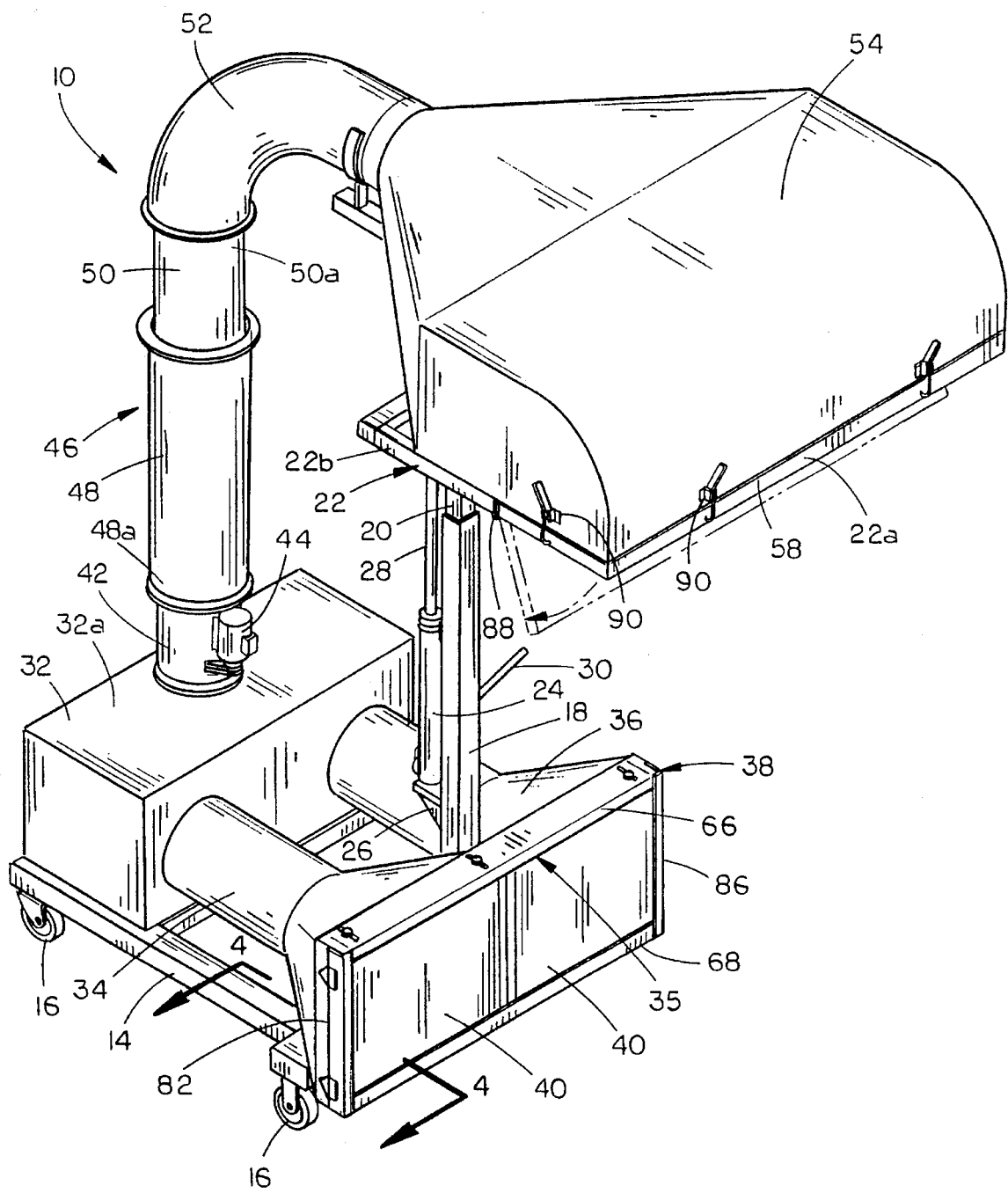
FIG. 2 is a perspective view of the invention.

As shown in FIGS. 1 and 2, filtration apparatus 10 includes a support frame 14 with a plurality of ground supporting wheels 16 mounted thereon to permit movement of frame 14 along the ground. An upright tube 18 is mounted to frame 14 and extends upwardly therefrom. An arm 20 telescopes within the upper end 18a of tube 18, and has a horizontally oriented upper frame 22 mounted to the upper end 20a thereof. Thus, upper frame 22 is vertically adjustable relative to lower support frame 14 by the telescoping action of arm 20 within tube 18.

A hydraulic cylinder 24 has a lower end supported on a projecting flange 26, which is affixed to tube 18. An extensible elongated rod 28 projects from the upper 24b of cylinder 24 and is extendible and retractable by operation of a conventional actuator arm 30 operably connected to cylinder 24. The upper end 28a of rod 28 is mounted to upper frame 22, such that actuation of cylinder 24 will raise and lower frame 22 on telescoping arm 20.

Referring now more specifically to FIG. 2, an air intake cabinet 32 is mounted on the rearward end of lower frame 14 and has a pair of intake ducts 34 and 36 projecting forwardly therefrom and supported on a forward end of support frame 14. An intake filter rack, designated generally at 38 is mounted on the forward end of intake ducts 34 and 36 and supports a plurality of individual filters 40 therein, as described in more detail hereinbelow.

A blower fan is mounted within a vertically oriented section of blower section 42 which communicates with the interior of cabinet 32, and is mounted so as to project from an upper surface 32a of cabinet 32. A motor 44 is mounted to the exterior of blower section 42 and drives the blower fan within blower section 42.

A telescoping section 46 includes an outer pipe 48 affixed at its lower end 48a to the upper end of blower section 42. An inner pipe 50 telescopes within outer pipe 48 and extends upwardly therefrom. A pipe elbow 52 connects the upper end 50a of inner pipe 50 to an exhaust vent 54, which projects forwardly beyond the forward end of intake vents 34 and 36, and is supported on upper frame 22. An exhaust filter rack 56 is mounted over the exhaust opening 58 (shown in FIG. 1) to further filter air circulated through filtration apparatus 10.

Figure 3:
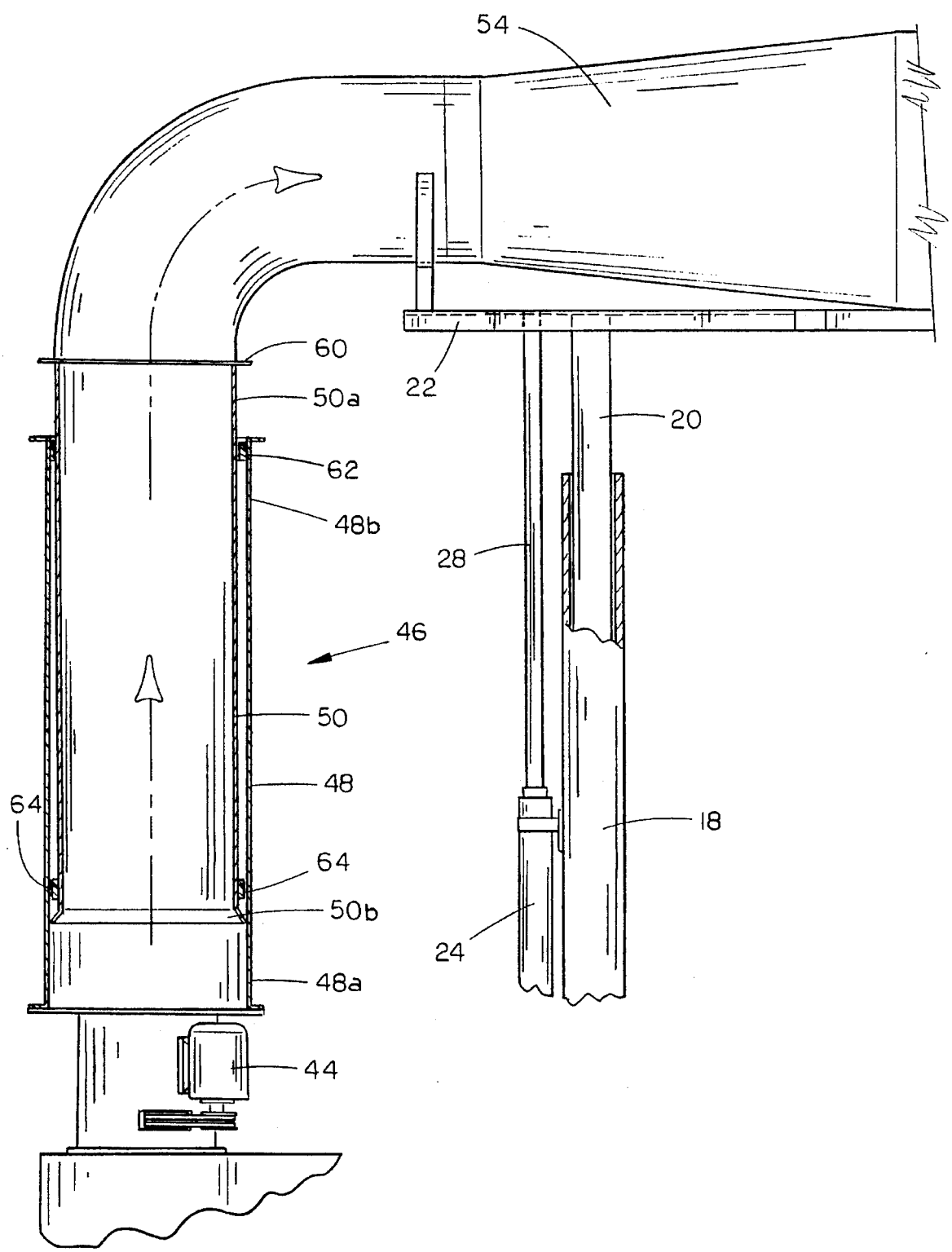
FIG. 3 is an enlarged side elevational view with telescoping portions shown in sectional view.

As shown in FIG. 3, the upper end 50a of inner pipe 50 has an annular flange 60 affixed to the outer surface, which acts as a stop against the upper end of outer pipe 48, as exhaust vent 54 is lowered. A neoprene ring 62 is affixed to the interior surface of the outer pipe upper end 48b, which serves as a bearing for the telescoping inner pipe 50. The lower end 50b of inner pipe 50 is flared outwardly to block air flow between inner pipe 50 and outer 48. Stops 64 are welded to the exterior surface of the lower end 50b of inner pipe 50, to contact ring 62 and prevent upward movement of inner pipe lower end 50b beyond the upper end of outer pipe 48.

As shown in FIG. 2, intake ducts 34 and 36 extend rearwardly from a single forward chamber 35. Forward chamber 35 includes intake filter rack 38, to adjustably and removably receive a plurality of filters 40.

FIGS. 4 and 5 show the details of the intake filter rack 38 within forward chamber 35. Forward chamber 35 includes an upper wall 35a, lower wall 35b and opposing side walls 35c and 35d, to form a generally rectangular intake tube. An upper lip 35e depends downwardly from the forward end of upper wall 35a, and a lower lip 35f projects upwardly coplanar with upper lip 35e from lower wall 35b. Upper and lower lips 35e and 35f thereby form a stop, to prevent forward movement of filters 40 outwardly from within forward chamber 35.

An upper channel 66 extends horizontally within forward chamber 35, and a lower channel 68 is spaced below and parallel to channel 66. Upper channel 66 has a downwardly depending forward leg 66a and a downwardly depending rearward leg 66b, connected by a base portion 66c. Similarly, lower channel 68 includes an upwardly projecting forward leg 68a, a rearward leg 68b and a base portion 68c. Upper and lower channels 66 and 68 are oriented with their forward legs 66a on 68a coplanar, such that filters 40 may be stacked face to face and journaled between lip 35e and leg 66a, and between lip 35f and leg 68a, as shown in FIG. 4.

An adjustable upper clip 70 includes a channel portion 70a and a rearwardly extending leg 70b. Leg 70b has a pin 72 journaled through an aperture therein and thence through a slot 74 in the upper surface 35a of forward chamber 35. A knurled knob 76 is threaded on to the projecting end of pin 72 to selectively retain upper clip 70 in a desired position.

Channel portion 70a of upper clip 70 includes an upwardly projecting leg 70c, parallel with forward and rearward legs 66a and 66b of upper channel 66, and journaled therebetween. A guide pin 78 extends between forward and rearward legs 66a and 66b, and is journaled through an aperture in clip portion leg 70c such that upper channel 66 is slidably journaled on leg 70c. A coil spring 80 is journaled on pin 78 between upper channel forward leg 66a and upper clip forward leg 70c, to bias channel 66 forwardly relative to clip 70, into contact with the rearward face of filters 40.

A lower clip 70' is provided to adjustably hold lower channel 68, with a knurled knob 76', in the same fashion as upper clip 70. A compression spring 80' on a pin 78' between the forward and rearward leg 68a and 68b of channel 68 is biased against forward leg 70c' to bias channel 68 forwardly against the rearward face of filters 40. Thus, the forwardly directed force applied by upper and lower channels 66 and 68 will clamp filters 40 in position against lips 35e and 35f respectively. Knurled knobs 76 and 76' permit a wide variety of filter widths and numbers of filters to be installed in filter rack 38.

Referring to FIG. 5, a door 82 is mounted at one transverse end of forward chamber 35 to cover the openings between channel forward legs 66a and 68a and lips 35e and 35f, and prevent transverse movement of filters therebetween. A pair of hinges 84 along a rearward vertical edge of door 82 permit pivotal movement of the door outwardly, in order to permit installation of filters into the openings between the channels 66 and 68 and lips 35e and 35f. As shown in FIG. 2, a similar door 86 is operably installed on the opposite end of forward chamber 35.

As shown in FIG. 1, exhaust filter rack 56 is pivotally connected at its rearward end to the forward end 22a of upper frame 22, at hinge 88. A plurality of clamps 90 operably mounted on exhaust vent 54 selectively retain filter rack 56 in operable position over exhaust opening 58.

In operation, a vehicle 12, or other object to be painted, is positioned forwardly of the intake ducts 34 and generally below the exhaust vent 54 of air filtration apparatus 10. Exhaust vent 54 may be lowered or raised as necessary to accommodate the object to be painted, by operating actuator arm 30 and raising upper frame 22 to the position shown in broken lines in FIG. 1.

Doors 82 and 86 on filter rack 38 are then opened to remove dirty filters and replace them with the desired filter size and number of filters, as shown in FIG. 2. Because of the adjustability of spring loaded channels 66 and 68, shown in FIGS. 4 and 5, a wide variety of different filter types and sizes may be utilized in filter rack 38.

Referring once again to FIG. 1, once filters have been placed in filter rack 38, the appropriate filters are placed in exhaust rack 56, and rack 56 is clamped in position with clamps 90. Motor 44 is then activated to operate lower section 42 and cause air with particulate to be drawn through intake filter rack 38 and exhaust it through exhaust filter rack 56, as shown by arrows 90.

Whereas the invention has been shown and described in connection with the preferred embodiment thereof, many modifications, substitutions and additions may be made which are within the intended broad scope of the appended claims.

I claim:

1. An air filtration apparatus comprising:

an intake duct having an intake opening in a forward end thereof;

a vertical pipe section having a lower end connected to a rearward end of the intake duct;

an exhaust duct having a rearward end connected to an upper end of said pipe section, and a forward end projecting forwardly from the rearward end;

an exhaust opening formed in a bottom surface of the exhaust duct forward end;

said intake duct, pipe section and exhaust duct forming an air flow passage from the intake opening to the exhaust opening;

a blower mounted in said air flow passage for moving air from the intake opening, through the air passage and out the exhaust opening;

a first particulate filter mounted in said intake opening;

a second particulate filter mounted in said exhaust opening; and said pipe section including means for selectively adjusting the vertical length between the upper and lower ends of the pipe section, thereby selectively adjusting the location of the exhaust opening in a vertical direction relative to the intake opening, including:

said pipe section including a telescoping pipe section;

a vertically oriented length adjustable upright with an upper end connected to the exhaust duct and a lower end connected to the intake duct; and means operably connected to the upright for selectively adjusting the length thereof;

said telescoping pipe section including:
an outer pipe having a lower end connected to the rearward end of the intake duct and extending upwardly therefrom to an upper end;
an inner pipe having an upper end connected to the rearward end of the exhaust duct and a lower end extending outwardly therefrom; said inner pipe telescoping within said outer pipe to form a length adjustable air passage therethrough.

2. The air filtration apparatus of claim 1, wherein said upright is an operable cylinder having an extensible rod, the rod connected to the exhaust duct and the cylinder connected to the intake duct.

3. The air filtration apparatus of claim 2, wherein said means for selectively adjusting the vertical length of the upright includes an actuator arm for operating the cylinder to selectively extend and retract the rod.

4. The air filtration apparatus of claim 1, further comprising air seal means mounted between the inner and outer pipes, for substantially preventing the escape of air between the inner and outer pipes.

5. The air filtration apparatus of claim 1, wherein said intake duct includes an upper wall, a lower wall, opposing side walls and a forward end, and further comprising a filter rack within said duct for removably supporting the first particulate filter.

6. The air filtration apparatus of claim 5, wherein said filter rack includes:

an upper lip depending from the upper wall forward end and a lower lip coplanar with the upper lip projecting upwardly from the lower wall forward end, to prevent forward movement of the first filter out of the intake duct; and upper and lower biasing means connected to the upper and lower walls rearwardly of the upper and lower lips, for biasing said first filter forwardly against the upper and lower lips.

7. The air filtration apparatus of claim 6, wherein: said upper biasing means includes:

an upper channel with forward and rearward legs depending from a base, the forward leg parallel to the upper lip;

an upper clip connected to the duct upper wall and having a forward leg projecting upwardly between the upper channel forward and rearward legs; and a spring operably mounted between the upper channel forward leg and upper clip forward leg, biasing the upper channel forwardly against the first filter; and said lower biasing means includes:

a lower channel with forward and rearward legs projecting upwardly from a base, the forward leg parallel to the lower lip;

a lower clip connected to the duct lower wall and having a forward leg projecting downwardly between the lower channel forward and rearward legs; and a spring operably mounted between the lower channel forward leg and lower clip forward leg, biasing the lower channel forwardly against the first filter.

8. The air filtration apparatus of claim 7, wherein said upper clip is selectively and adjustably connected to the duct upper wall for selective adjustment forwardly and rearwardly, and wherein said lower clip is selectively and adjustably connected to the duct lower wall for adjustment forwardly and rearwardly.

9. The air filtration apparatus of claim 9, further comprising wheel means connected to the intake duct for movably supporting the air filtration apparatus on a support surface.

\* \* \* \* \*